United States Patent [19]
Bibler

[11] 3,718,118
[45] Feb. 27, 1973

[54] POULTRY HANDLING SYSTEM

[76] Inventor: David R. Bibler, Route 5, Russellville, Ark. 72801

[22] Filed: Aug. 2, 1971

[21] Appl. No.: 167,951

[52] U.S. Cl. ..................119/16, 119/22, 119/82
[51] Int. Cl. .....................A01k 31/18, A01k 31/04
[58] Field of Search...........119/15, 16, 21, 22, 20, 82

[56] References Cited

UNITED STATES PATENTS

| | | | |
|---|---|---|---|
| 2,604,874 | 7/1952 | Forbes et al. | 119/15 |
| 3,103,915 | 9/1963 | Crain et al. | 119/82 |
| 3,110,388 | 11/1963 | Elliott et al. | 119/82 X |

*Primary Examiner*—Hugh R. Chamblee
*Attorney*—Giles C. Clegg et al.

[57] ABSTRACT

Disclosed is a system for collecting live broilers from a broiler house and depositing them in transport cages for removal to slaughter. The apparatus includes an endless belt conveyor disposed in a conduit in the floor of the broiler house exiting through a tunnel. A chaser fence crowds the birds onto the conveyor which deposits them on an enclosed elevator conveyor outside the house. The elevator conveyor deposits the birds in waiting transport cages without ever catching or individually handling each bird. The conduit in the floor of the broiler house is also used for conducting ventilating air through the broiler house and for removing litter.

14 Claims, 10 Drawing Figures

POULTRY HANDLING SYSTEM

This invention relates to methods and apparatus for raising poultry. More particularly it relates to a system for mechanically collecting poultry from a broiler house or the like, caging them and transporting them to slaughter without individually handling each bird.

In present commercial broiler raising young birds are placed in a relatively large enclosure, known as a broiler house, where they are confined and fed until they reach the age and size suitable for slaughter. At this time the broilers are usually individually caught, placed in cages and transported to the slaughter house.

Catching broilers in a broiler house is ordinarily a time consuming and difficult job. Conventionally a crew of up to ten men may work several hours catching as many as 15,000 birds in a house. Each bird is individually caught and placed in a cage for transport to the slaughter house. Obviously catching each bird individually is time consuming and costly. Furthermore, the birds are often frightened by individual handling and are likely to panic and injure themselves, frequently resulting in injuries to large numbers of birds, thus decreasing their market value.

In accordance with the present invention a mechanical catching and caging apparatus is provided as an integral part of the broiler house which eliminates individual handling of each bird. The apparatus basically comprises an endless belt conveyor traversing substantially the length of the broiler house at near floor level. The conveyor exits the broiler house through a shroud or tunnel. A moveable chaser is included in the broiler house to crowd the birds toward the moving conveyor. As the birds are crowded onto the conveyor belt, the conveyor moves through the tunnel and exits the broiler house to deposit the birds on a second endless belt conveyor mounted on a truck or similar device which elevates and deposits the birds in cages on a waiting transport truck.

Since the birds are not individually handled the danger of injury to each bird is substantially decreased. Furthermore, since the entire catching and caging operation is substantially mechanized, as well as rapid, the cost of manual labor is minimized, thereby substantially reducing the overall cost of catching and transporting the birds. Using conventional catching methods, the birds may be caged for transport as long as ten hours. Accordingly, any bruises caused by handling will cause discolored meat which must be discarded. Using the present system, the entire flock of birds in a broiler house may be caught, caged, transported and slaughtered within 3 hours. Therefore, less bruised meat will be rejected since the birds will be slaughtered before sufficient time has elapsed to form discolored meat at the bruise.

The conveyor housing of the invention is permanently installed in the broiler house at essentially floor level. The housing may therefore advantageously be used for other purposes such as transporting litter and the like from the broiler house. The conveyor housing may also be used as a ventilating device or for conducting heating or cooling air through the broiler house. Since the conveyor channel is centrally disposed in the floor of the house, it is ideally located for conducting ventilating air through the house when not in use as a conveyor housing.

Other advantages and features of the invention will become more readily apparent from the following detailed description taken in connection with the appended claims and attached drawings in which:

Figure 1:
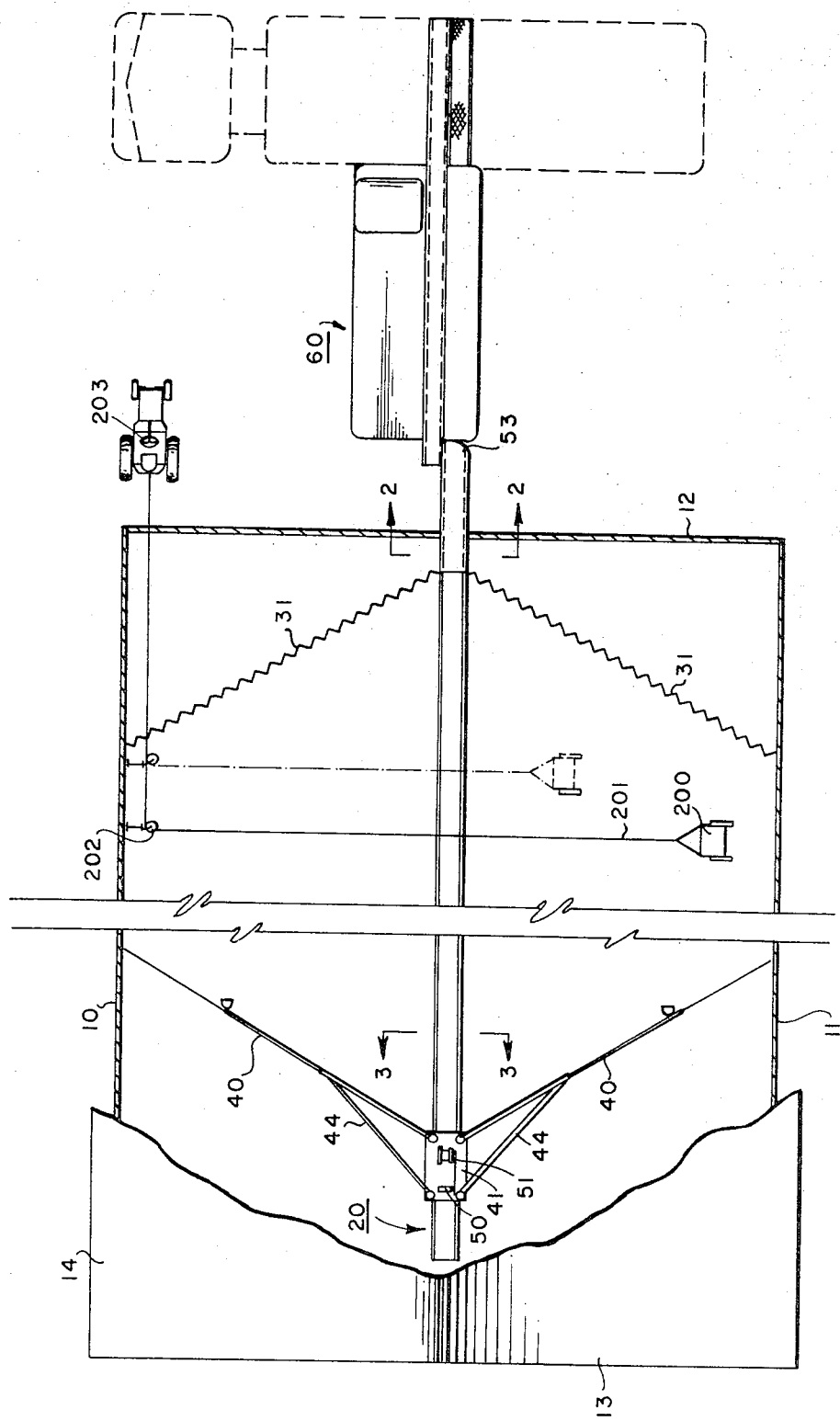
FIG. 1 is a top plan view of a broiler house incorporating one embodiment of the poultry handling system of the invention.
Figure 2:
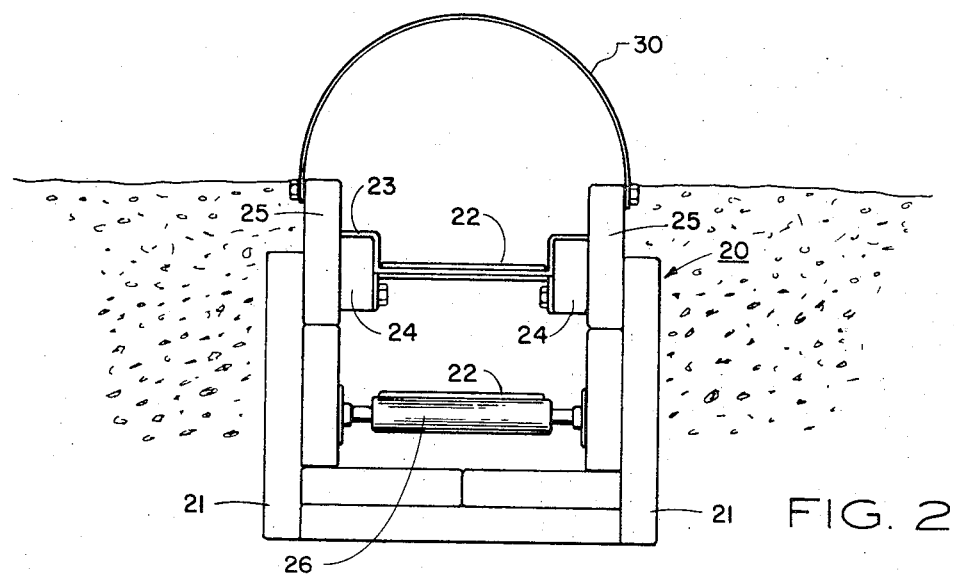
FIG. 2 is a sectional view of the conveyor system installed in the broiler house illustrated in FIG. 1.
Figure 3:
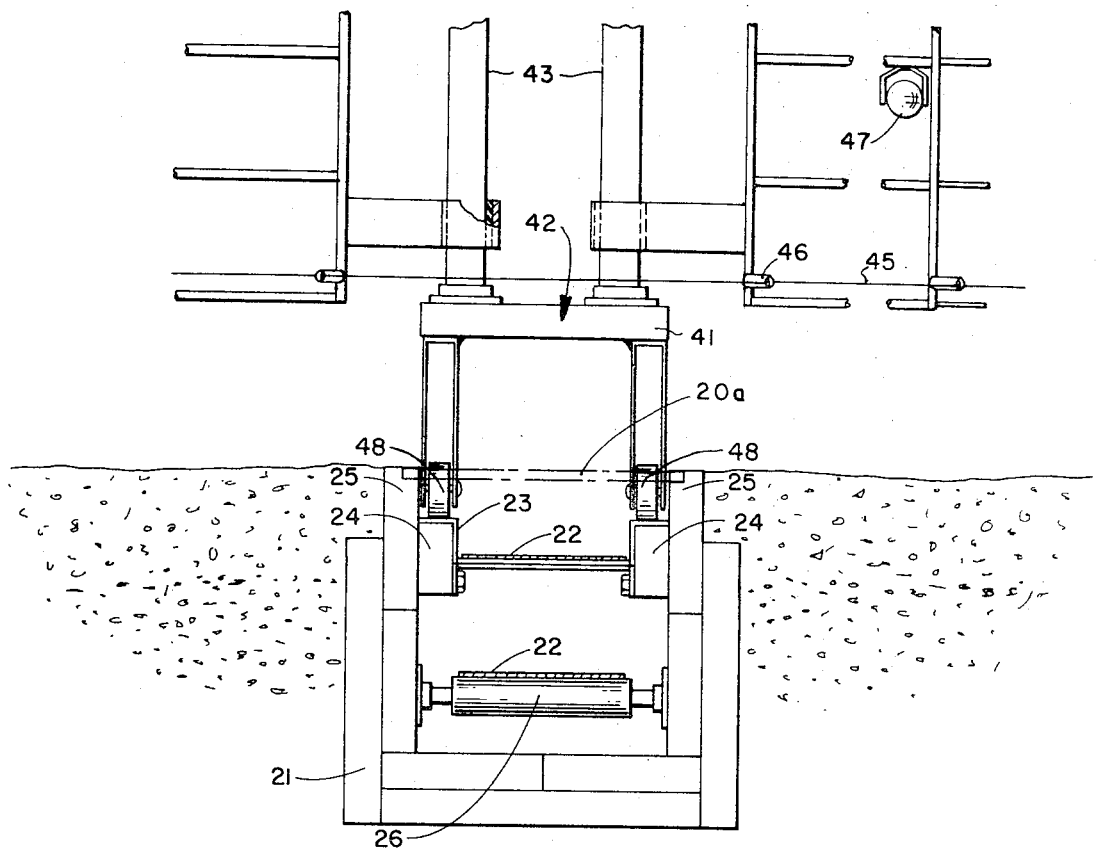
FIG. 3 is a sectional view of the conveyor system illustrated in FIG. 1 and showing the moveable chaser fence for crowding birds into the conveyor.

Referring now to FIGS. 1, 2 and 3, there is diagrammatically illustrated a broiler house having side walls 10 and 11, end walls 12 and 13 and a roof structure 14. The broiler house may be of any conventional design suitable for housing broilers for feeding. Generally such broiler houses are about 30 to 40 feet wide and about 300 feet long and accomodate about 15,000 birds.

In the preferred embodiment of the invention a linear trench or channel 20 is substantially centrally located in the floor of the house traversing a major portion of the length thereof. The trench or channel 20 may contain a suitable liner 21 such as wood or concrete which acts as a housing for an endless conveyor belt 22. The channel may be about 12 to about 18 inches in width and adapted to accomodate a conveyor belt of similar dimensions.

A channel plate 23 is suspended between blocks 24 which are in turn supported by wall members 25 defining the opening of the channel. The surface of the channel plate 23 is preferably about 10 inches below the level of the floor of the house. The return side of endless conveyor belt 22 may be supported within the channel by suitable rollers 26 and may be driven by conventional drive and tension means (not shown) or by drive means as hereinafter described.

As illustrated in the embodiment of FIG. 1 channel 20 extends through one end wall 12 of the broiler house. Approximately three to five feet of the channel 20 adjacent the exit end wall and that portion of the channel extending outside the broiler house are covered by a half-cylindrical shroud 30 or a flat cover. It will thus be observed that shroud 30 in cooperation with the side walls 25 forms a tunnel with the conveyor belt 22 forming a moving floor therein.

A catching fence 31 attached at the open end of the shroud 30 within the broiler house extends to the walls 10 and 11 on opposite sides of the channel. Catching fence 31 is preferably slightly diagonally disposed forming a V to assist in crowding the birds toward the open end of the tunnel. Catching fence 31 is preferably a screen or the like which may be rolled or folded for storage or transport when not in use.

A chaser fence 40 is mounted on a sled 41 adapted to ride in the channel. Sled 41 preferably comprises a rectangular frame 42 supported by casters 48. Casters 48 are adapted to ride on the shoulder formed by mounting blocks 24 within the confines of side walls 25. Accordingly, the side walls 25 and support blocks 24 form a track and guide for the sled 41. Chaser fence 40 is preferably formed of self-supporting tubular aluminum gridwork or the like suspended from vertically extending mounting standards 43 on the sled 41. The chaser fence 40 preferably extends outwardly and forwardly from the sled toward the outer walls 10 and 11 of the broiler house and is preferably suspended vertically slightly above the floor. Where the span of the chaser fence 40 is too long to be self-supporting, outrigger casters (not shown) may be attached to the chaser fence to support the outer portions thereof.

An electrical shock wire 45 connected to a suitable power source (not shown) mounted on insulators 46 may be suspended along the side and near the bottom of the fence 40 to encourage movement of the birds away from the chaser fence as the fence is moved. Since the apparatus will ordinarily be used in darkness, low power lights 47 may be disposed along the chaser fence 40 to illuminate the area immediately adjacent the moving fence.

In the preferred embodiment of the invention the chaser fence 40 is comprised of a substantially rigid telescoping frame to allow adjustment of the length thereof. Accordingly the length of the chaser fence may be adjusted to extend fully from the support sled 41 to walls 10 and 11. Chaser fence 40 is also preferably hingedly mounted on the support sled 41 to allow pivitol movement of the fence in the horizontal plane. Braces 44 projecting laterally from the support sled 41 to the fence 40 are preferably telescoping and spring loaded to maintain the chaser fence in a position projecting slightly forwardly from the support sled 41. Since the braces 44 are spring loaded, erratic movement of the support sled 41 will cause the fence 40 to move in an oscillatory or erratic flapping motion which aids in urging the birds toward the catching fence 31.

Since the fence 40 is supported and projects forwardly from the support sled 41, suitable counterweights 50 may be positioned on the support sled 41 to counterbalance the apparatus. The support sled and chaser fence 40 may be moved laterally along the channel 20 by any conventional means such as a hand or power wench 51 attached to the support sled which winds up cable (not shown) attached to the opposite end of the broiler house. Alternatively, power means may be mounted on the sled to drive it in either direction. Other suitable means for moving the support sled will be obvious to those skilled in the art.

It will be readily understood that part of the poultry catching apparatus described hereinabove may be formed as an integral part of the broiler house structure and used only on a periodic basis for catching and loading the broilers at the time they reach slaughter age. Accordingly, when not in use the conveyor channel 20 traversing the floor of the broiler house may be covered with a suitable temporary cover 20a.

Since the poultry handling system will ordinarily be used on a periodic basis, cost of installation may be minimized by installing only the conveyor channel in each house. The conveyor belt may be readily removed and used in connection with a plurality of broiler houses equipped with similar channels. Accordingly, as the belt is withdrawn from the channel, it may be replaced by a small cable which will remain in the channel and provide means for rethreading the belt through the channel.

Chaser fence 40 may be collapsible to facilitate storage thereof when not in use yet provide ease of assembly for operation. Likewise, where a plurality of houses are equiped with similar channel installations, a single chaser fence and sled 41 may be used. Therefore, fence 40 and sled 41 are preferably adapted to be collapsible and easily transported. Furthermore, catching fence 31 may also be transportable for the same reasons.

When assembled for operation, catching fence 31 is erected as illustrated in FIG. 1 and sled 41 positioned at the end of channel 20 opposite the entrance to the tunnel.

The chaser fence 40 is erected with the broilers confined within the area defined by the walls 10 and 11, catching fence 31 and chaser fence 40. The sled 41 is then slowly or erratically advanced along the channel with chaser fence 40 extending from the sled to the walls on opposite sides thereof. As the sled traverses the channel the space between the chaser fence 40 and catching fence 31 diminishes, thereby causing the birds to be crowded onto the conveyor belt.

The catching operation is preferably performed at night or in darkened conditions. Accordingly, as the birds are crowded they will move onto the moving conveyor belt. When on the moving conveyor belt the birds generally crouch and remain motionless and are moved through the tunnel to the exit. It will thus be observed as the space between the catcher fence and the chaser fence diminishes all the birds in the house will be forced onto the conveyor belt without being individually handled. It has been discovered that when the birds are placed on the moving conveyor belt, they tend to crouch and remain motionless with respect to the belt. The birds may then be readily transported by the conveyor belt in a manner as if they were inanimate.

When the birds reach the exit end of the conveyor belt they are forced off the belt by a shear 53 extending diagonally across the belt. Since the belt is continuously moving, when the birds reach the shear 53 they are forced to move or pushed off the belt through an exit in the side of the shroud 30.

Figure 8:
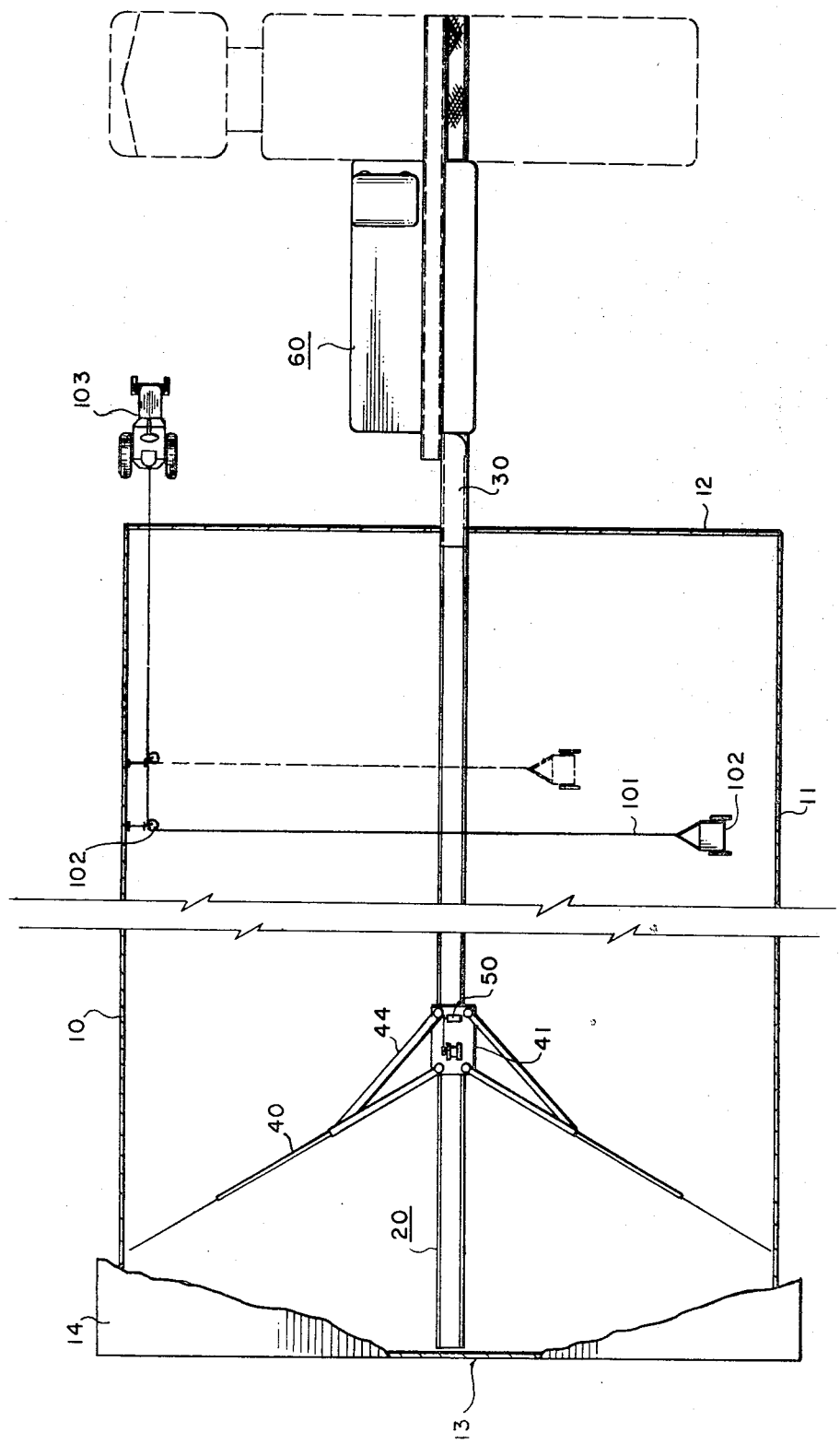
FIG. 8 is a top plan view of a broiler house incorporating an alternate embodiment of the invention.
Figure 9:
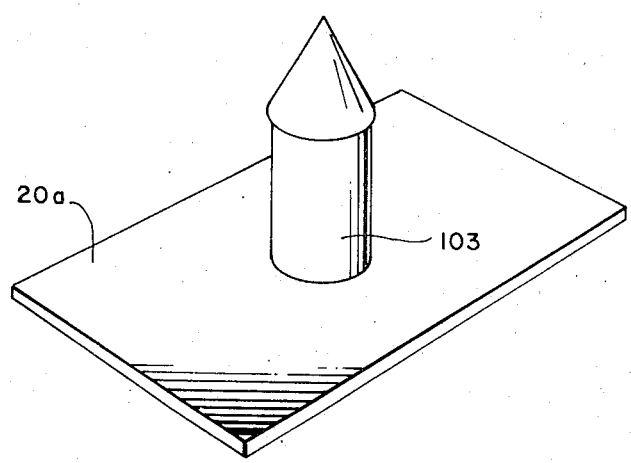
FIG. 9 is a pictorial illustration of a cover plate for the channel.

In the embodiment of the invention illustrated in FIG. 1, the chaser fence 40 and the belt conveyor 22 move in the same direction. It has been observed, however, that the birds are sometimes crowded too densely adjacent the catcher fence 31 and on the belt 22 at the entrance to the shroud 30, thus injuring some of the birds as they enter the shroud. In the embodiment shown in FIG. 8, the portion of shroud 30 extending within the walls of the broiler house and the catcher fence 31 is eliminated. Sled 41 and chaser fence 40 are then positioned on the tracks in channel 20 near the exit end of the channel with the fence 40 projecting slightly diagonally in the direction opposite the exit end. The birds are therefore confined between the fence 40, walls 10 and 11, and the opposite end wall 13. The procedure for crowding the birds onto the conveyor is essentially the same as described with reference to FIG. 1, however, in this embodiment the conveyor belt 22 and the chaser fence 40 move in opposite directions. It will thus be observed that as the chaser fence approaches the end wall 13, the birds will be crowded toward the open channel 20 containing the moving conveyor belt. When the birds fall into the open channel, they crouch and remain motionless with respect to the belt and are transported through the open channel 20, under the sled 41, and into the tunnel extending outside the end wall 12. Since the belt 22 is always moving away from the crowd of birds, they cannot bunch up in such numbers as to suffocate or cause themselves injury. Since the belt 22 is disposed about 10 inches below the floor level, a shroud is not necessary to keep the birds on the conveyor.

Figure 10:
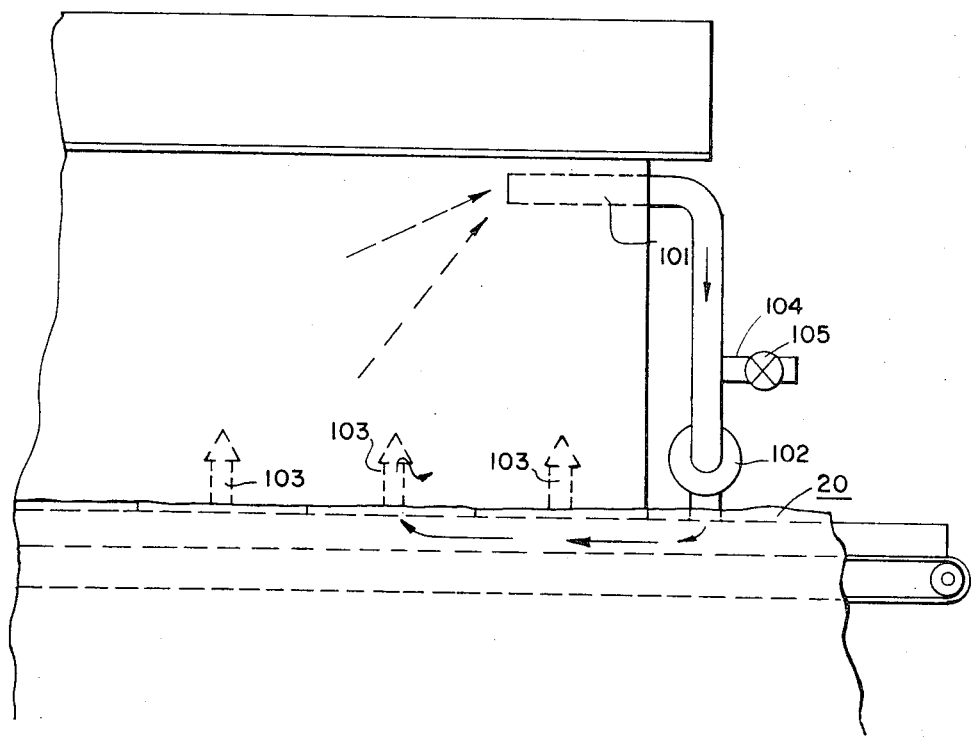
FIG. 10 is a fragmentary elevational view of a broiler house incorporating a ventilation system with the transporting system of the invention.

Since the conveyor channel is centrally disposed in the floor of the broiler house, it may be advantageously used as a duct for distributing heating, cooling or recirculating air through the structure. As shown in FIG. 10, a return air conduit 101 may be positioned internally near the roof of the house and connected to the channel 20 through a blower 102. Air inside the house may be withdrawn through the return air duct 101 and recirculated through the house as indicated by the arrows in FIG. 10. A cover for the channel 20 may be provided in short sections 20a as shown in FIG. 11. The cover sections 20a are provided with outlet registers or pipes 103 projecting upwardly from the channel to direct air into the broiler house near floor level. In order to utilize the entire channel 20 as an air duct, small holes (not shown) may be formed in the channel plate 23 to allow air to pass therethrough.

In colder temperatures the air may be simple recirculated to provide sufficient ventilation. If cooling is desired, an inlet 104 and valve 105 may be provided in the return air conduit to permit mixing of cool outside air with the recirculating air. Likewise, in warmer temperatures, the recirculating air may be passed through a cooling tower (not shown) or the like to provide cooling for the house.

Figure 4:
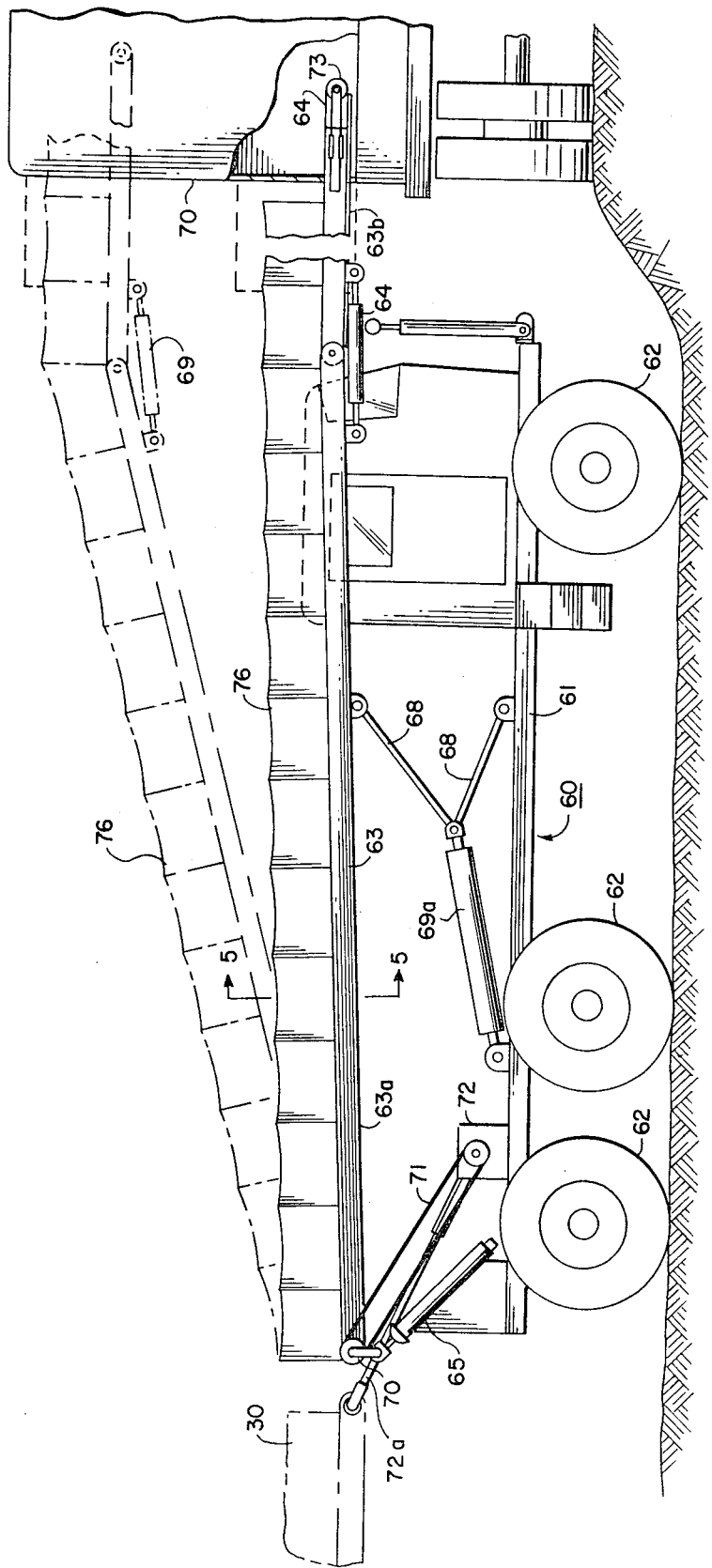
FIG. 4 is a side view of an elevator conveyor used in conjunction with the invention.

In the preferred embodiment of the invention the birds are transferred from the exit of the channel 20 into an elevator conveyor apparatus as illustrated in FIG. 4. The elevator conveyor is preferably comprised of a moveable or self-propelled vehicle generally indicated at 60 having a frame 61 and wheels 62. An articulated frame 63 is mounted thereon for supporting an endless conveyor belt 64. Frame 63 is pivotally mounted on frame 61 by means of a pair of hydraulic cylinders 65 attached to the frame 61 and hingedly attached to the lower end of conveyor frame 63. Accordingly, by means of hydraulic cylinders 65 the height of the lower or entrance end of the elevator conveyor can be adjusted as desired.

As illustrated in FIG. 4 the elevator-conveyor 60 is preferably disposed about three feet below the floor level of the broiler house so that the exit from shroud 30 may be aligned with the entrance to the elevator. This may be conveniently accomplished by elevating the end of the conveyor or by lowering the level of the ground at the end of the broiler house as illustrated in FIG. 4.

Figure 5:
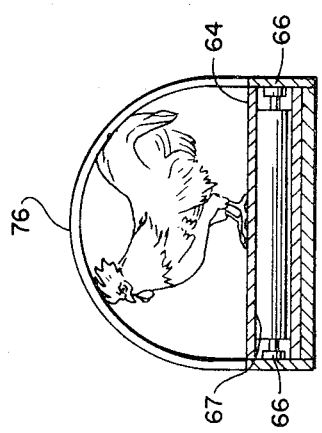
FIG. 5 is a sectional view of the elevator conveyor of FIG. 4.

As shown in FIG. 5 conveyor frame 63 is comprised of a pair of opposed parallel side members 66 with a belt tray 67 supported therebetween. The conveyor frame 63 is articulated having a first elevator section 63a and a cantilevered delivery section 63b hingedly attached to and forming an extension at the end of the first section.

Delivery section 63b is maintained substantially horizontal at all times regardless of the angle of the first section 63a by means of hydraulic cylinders 69.

The angle of the first section 63a, and thus the height of delivery section 63b, is varied as desired by sissor-type expandable mounting bars 68 activated by hydraulic cylinder 69a.

An endless conveyor belt 64 is mounted for movement between the side members 66 riding on support tray 67. The belt is powered by a drive roller 70 mounted between the side members 66 at the lower end. The roller 70 is driven by drive belt 71 and power source 72.

If desired, the same power source 72 may be used to drive the conveyor belt 22 by use of a suitable power transmitting shaft 72a. Alternatively, hydraulic motors may be used to drive both conveyor belts, the hydraulic power for driving such motors being produced by a suitable pump on the elevator-conveyor vehicle 60. A second roller 73 is mounted at the end of the second section 63b. Since the distance traversed by belt 64 will vary slightly as the angle between sections 63a and 63b is varied, roller 73 is preferably mounted between a pair of longitudinally extending bars 74 slideably attached to side members 66. Compression springs 75 encircling bars 74 provide tension on belt 64 by urging the roller 73 away from the frame 63b, thereby maintaining tension on the belt 64 at all times while allowing the length of the conveyor to vary as the height of the delivery section is varied.

Figure 7:
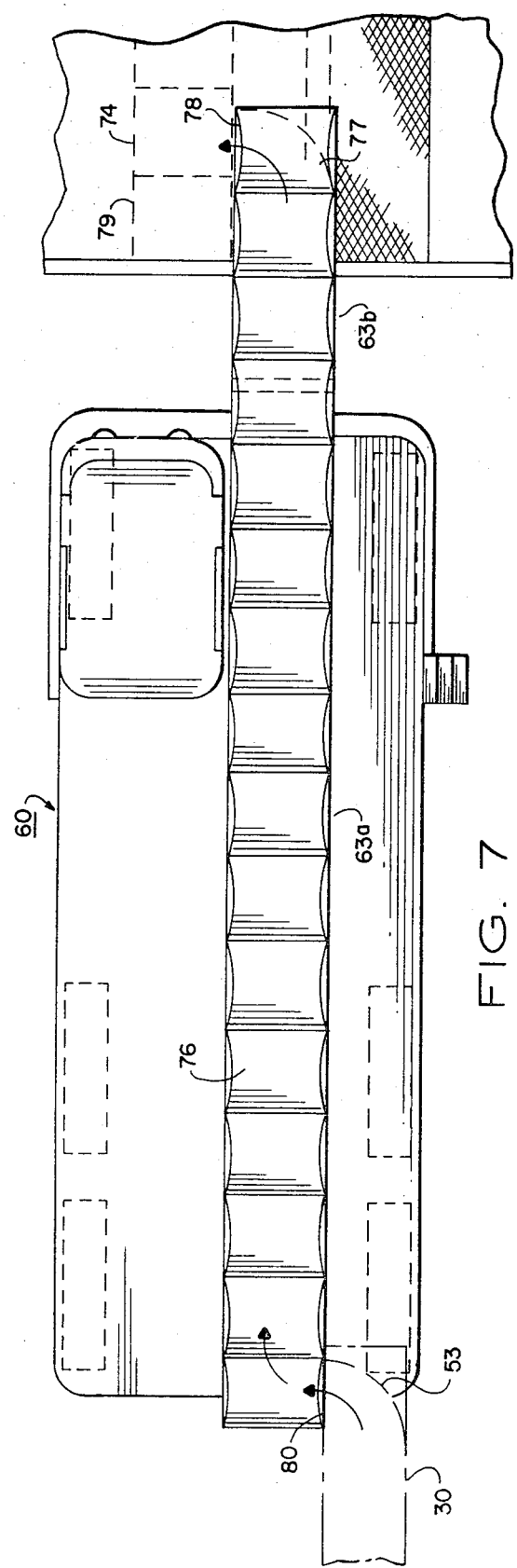
FIG. 7 is a top plan view of the apparatus shown in FIG. 4.
Figure 6:
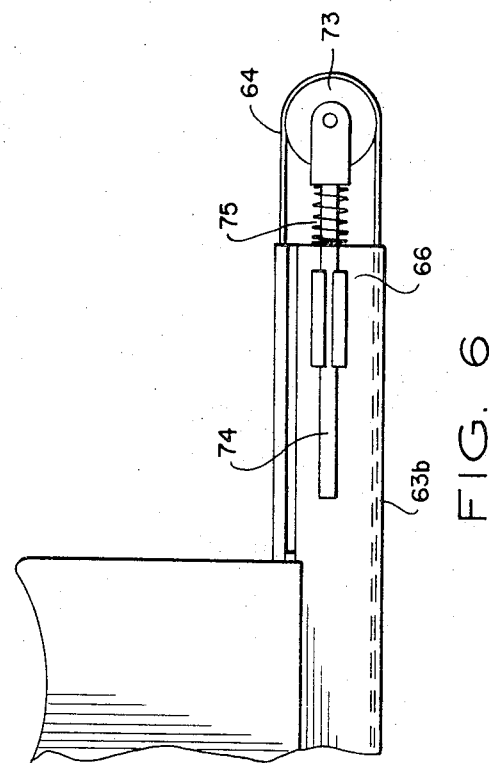
FIG. 6 is a pictorial illustration of the tension mechanism at the discharge end of the elevator conveyor.

As illustrated in FIG. 7 the top portion of the elevator conveyor is covered with a shroud 76 attached to side members 66 to form an enclosed tunnel with the moving conveyor belt 64 forming a moving floor therein. Shroud 76 has a side entrance 80 at the lower end thereof and a side exit 78 at the top end thereof. A shear 77 is moveably mounted on the delivery section 63a and cooperates with exit 78 to force the birds from the conveyor belt 64 into the waiting cages 79. The shroud 76 covering the top portion of delivery section 63b should be collapsible or telescopic so that the end shear 77 and exit 78 may be moved to traverse the full length of the delivery section 63b, thereby permitting the operator to move the exit 78 from one cage to the next and distribute birds in adjacent cages in a continuous process.

Cages 79 are preferably mounted in superimposed tiers on a transport vehicle. Accordingly as the cages in the first tier are filled the elevation of delivery section 63b is adjusted so that exit 78 coincides with an open door in a cage in an adjacent tier until all the cages in the transport vehicle are filled.

As illustrated in FIG. 4, the elevator conveyor may be adjusted in height to accomodate loading the tiered cages without moving the transport vehicle or the elevator 60. When all cages at the first level are filled, cylinders 69 and 69a are activated to raise or lower the delivery end and maintain the delivery section substantially horizontal. The birds are then loaded into the next tier of cages.

Since the elevator conveyor apparatus 60 is mobile, it may be rapidly moved for use at different broiler houses. Therefore, while each house has a permanently installed channel, only one elevator conveyor is required to service a large number of broiler houses.

It will be observed that a minimum crew of two people is required to operate the entire system; one to operate the chaser fence and sled and one to operate the delivery end of the elevator. Nevertheless with only two people operating the apparatus, the entire flock may be rapidly removed from the broiler house and loaded in transport cages without individual handling of any bird.

From the foregoing it will be observed that the birds in the broiler house are never individually handled, instead they are crowded onto a moving conveyor and handled in a continuous volume process until the cages in the transport vehicle are filled.

Since the conveyor channel 20 is permanently installed in the floor of the broiler house as described hereinabove, it may be utilized for purposes other than loading broilers. For example, litter may be removed from the broiler house by dumping same on a conveyor belt for deposit on a truck or the like outside the broiler house in the same manner as the broilers are moved.

Since the top of conveyor channel 20 is essentially at floor level, litter scoops or buckets 200 drawn by cables 201 passing through support pulleys 202 attached to the walls of the house may be used to move litter onto the moving conveyor for cleaning the broiler house. The cable 201 may be powered by any suitable power source such as a tractor 203 or the like outside the broiler house. It will be readily apparent that pulleys 202 may be detachably mounted on the supporting side structure of the broiler house and moved as desired to allow the operator to clean the entire floor of the broiler house.

It will be observed that the installation of permanent apparatus in each individual broiler house may be limited to construction of the channel 20 containing channel plate 23 and suitable hardware for mounting the required pulleys and rollers. The other components of the system, such as the catching fence 31, the chaser fence 40 and sled 41, the conveyor belt 22, and the elevator 60 may be readily moved from broiler house to broiler house as desired. Therefore only one of each of the latter components will adequately serve a large number of broiler houses, thus minimizing the capital investment per house.

From the foregoing it will be observed that the apparatus described provides rapid and inexpensive means for collecting and caging birds from a broiler house without injuring the birds. It will be readily appreciated, however, that the apparatus may be used for collecting and caging other birds, such as turkeys, and is not necessarily limited to use for broilers.

While the invention has been described with particular reference to specific embodiments thereof, it is to be understood that the form of the invention shown and described in detail is to be taken as the preferred embodiment of same, and that various changes and modifications may be resorted to without departing from the spirit and scope of the invention as defined by the appended claims.

What is claimed is:

1. In combination with an enclosed structure suitable for use as a poultry house and having a floor, and walls, side walls and a roof; poultry catching apparatus comprising:
 a. a channel traversing a major portion of the floor of said enclosed structure and extending through one end thereof;
 b. an endless belt conveyor mounted for longitudinal movement within said channel, the top surface of said endless belt disposed substantially horizontal and below the level of said floor;
 c. means covering the top of said conveyor belt and channel outside said enclosed structure, thereby forming a tunnel with a moving floor having an open entrance within said enclosed structure and an exit outside said structure;
 d. means for urging birds onto said endless belt conveyor comprising:
  i. support means adapted to traverse at least a major portion of said channel within said enclosed structure;
  ii. fence means suspended from said support means and extending from said support means to said walls of said enclosed structure; and
  iii. means for moving said support means and said fence means;
 and
 e. covered elevator means for collecting birds at the exit end of said tunnel and placing said birds into cages.

2. The apparatus defined in claim 1 wherein said means covering the top of said conveyor belt and channel extends through the end wall of said enclosed structure and covers a portion of said conveyor belt within said structure, and including means extending from the entrance of said tunnel to the walls of said enclosed structure for directing birds into said open entrance.

3. The apparatus defined in claim 1 wherein the top side of said endless conveyor belt is drawn over a support plate having a substantially flat base, upstanding walls, and laterally projecting flanges; and said channel has vertical side walls adjacent to and extending above said flanges, said conveyor belt riding on said substantially flat base between said upstanding walls.

4. The apparatus defined in claim 3 wherein said support means comprises a table mounted on casters adapted to ride on said laterally projecting flanges of said support plate between said vertical side walls.

5. The apparatus defined in claim 4 including electrical shocking means projecting from said fence means on the side thereof facing said tunnel.

6. The apparatus defined in claim 1 wherein said fence means comprises a rigid frame hingedly attached to said support means and adapted for movement in the horizontal plane, and includes telescoping spring loaded braces extending laterally from said support means to said fence means.

7. The apparatus defined in claim 1 wherein said means covering the top of said conveyor belt has an opening on the side thereof near the exit end aligned with shear means for urging birds from said endless belt toward said opening.

8. The apparatus defined in claim 1 including stationary fence means extending from the walls of said structure to the open entrance of said tunnel and aligned to crowd birds onto said endless belt conveyor.

9. The method of collecting and removing live birds from a poultry house comprising the steps of:
   a. disposing an endless conveyor belt in a channel traversing a substantial portion of the length of said poultry house, the top of said belt being disposed below the surface of the floor of said poultry house;
   b. moving the top surface of said endless belt in a first direction toward an opening in the end wall of said house;
   c. disposing a moveable fence within said house near and approximately parallel with the end wall of said house having the said opening therein; and
   d. moving said moveable fence along said channel in the direction opposite the movement of said conveyor belt, thereby crowding said live birds onto said endless conveyor belt.

10. The method set forth in claim 9 wherein said top surface of said conveyor belt is disposed about 10 inches below the level of the floor of said house.

11. In combination with a structure for use as a broiler house having a roof, side walls, end walls, and a floor; apparatus comprising:
   a. a channel longitudinally disposed in said floor and traversing substantially the length of said house;
   b. an endless conveyor belt for removing poultry and litter from said house, means for supporting said endless conveyor belt within said channel, the top surface of said conveyor belt being disposed approximately 10 inches below the level of said floor, one end of said conveyor belt exiting through one end of said house;
   c. removeable cover means covering said channel, thereby forming a duct, said cover means having openings therein allowing fluid communication between the interior of said house and said duct;
   d. air collection means disposed within the interior of said house near said roof; and
   e. duct and blower means interconnecting said channel and said air collection means.

12. Apparatus as defined in claim 11 including an inlet in said duct means for mixing ambient air with the recirculating air.

13. Apparatus as defined in claim 11 including means for cooling the air passing through said duct and blower means.

14. Apparatus as defined in claim 11 including a litter scoop adapted to remove litter from the floor of said house and deposit said litter in said channel, and means for urging said litter scoop toward said channel.

* * * * *